Patented Dec. 12, 1933

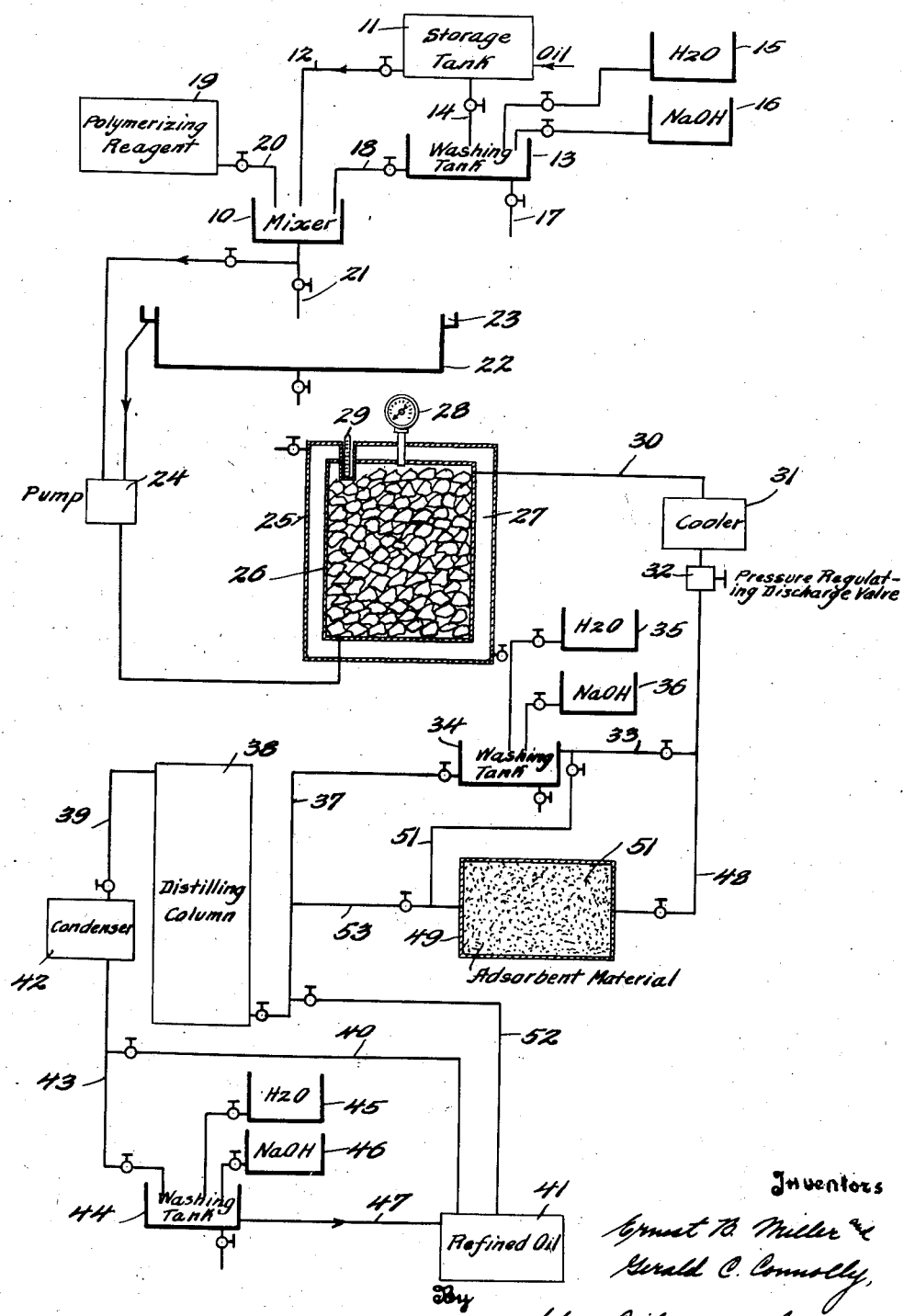

1,939,129

UNITED STATES PATENT OFFICE 1,939,129

METHOD OF REFINING LIQUID LOW BOILING DISTILLATES

Ernest B. Miller and Gerald C. Connolly, Baltimore, Md., assignors to The Silica Gel Corporation, Baltimore, Md., a corporation of Maryland Application February 19, 1930. Serial No. 429,722

8 Claims. (Cl. 196—40)

The present invention relates to methods of refining liquid hydrocarbons and more particularly to those containing gum forming constituents, for example, cracked distillates, mixtures of cracked distillates with straight-run products, shale oils and hydrocarbons recovered from coke oven gases.

One feature of the invention resides in the treatment of the hydrocarbon at an elevated temperature and pressure sufficient to keep it in the liquid phase, this heat treatment being effected in the absence of any solid porous adsorbent material.

Another feature of the invention is the treatment of the hydrocarbon with a substance capable of reacting with the gum forming constituents, to polymerize the more easily reactive of the gums, and subjecting the hydrocarbon to an elevated temperature and pressure sufficient to keep it in the liquid phase, this treatment being effected in the absence of any solid porous adsorbent material.

Other features of novelty and objects will be apparent from the following description taken in connection with the drawing, wherein the single figure is a diagrammatic illustration of apparatus for carrying out the methods according to this invention.

Before describing the apparatus and the steps of the process in detail, a summary of the steps will be given. In a brief and general way the steps of the process are as follows:

1. The hydrocarbon is treated with a substance that reacts with gum forming constituents to polymerize the more easily reactive gums.
2. The sludge and any solid matter is removed.
3. The hydrocarbon is subjected to an elevated temperature and pressure sufficient to keep most of the hydrocarbon in the liquid phase.
4. After the heat and pressure treatment, the hydrocarbon is cooled, and thereafter may be subjected to either one of the following series of steps titled A and B:

A

5a. After step No. 4 above, the hydrocarbon is washed.

6a. The polymerized gums are separated from the hydrocarbon as by distilling.

7a. If necessary, the distillate may be washed.

B

5b. After step No. 4 mentioned above, the hydrocarbon is treated with a solid porous adsorbent material, like silica gel, at normal temperature.

6b. The hydrocarbon may then be washed, if necessary.

7b. If all of the polymerized gums have not been removed by the treatment with the adsorbent material, the hydrocarbon may be distilled.

8b. If necessary, the distillate may be washed.

An apparatus for carrying out these treatments is diagrammatically shown in the drawing. Thus the hydrocarbon to be treated and the substance for reacting with the gum forming constituents or unsaturated hydrocarbons is delivered into a mixing or agitating device 10. The hydrocarbon, which, as previously stated, may be a cracked distillate, shale oil, or oil recovered from coke oven gases, such as benzol, is delivered into the mixer from a storage tank 11 through a pipe 12. If this hydrocarbon requires washing, this can be effected in the tank 13, the oil being delivered to the same from the storage tank 11 through the pipe 14. 15 indicates a supply of water and 16 of a dilute solution of sodium hydroxide for the tank 13. The treatment of the hydrocarbon with water or sodium hydroxide is for the purpose of removing hydrogen sulphide. The washing tank 13 has an outlet 17 for the wash liquid and an outlet pipe 18 for supplying the treated hydrocarbon to the mixer 10.

The term "washed" as employed herein means that the liquid may be treated either with water or sodium hydroxide or both.

The polymerizing substance is supplied to the mixer from a tank 19 through the pipe 20. The substance employed for reacting with the unsaturated hydrocarbons or for polymerizing the gum forming constituents may be any suitable acid, such as sulphuric, hydrochloric or acetic, or an acid-yielding salt or compound, such as aluminum chloride or dimethyl sulphate. It is preferred to employ sulphuric acid, although it is to be understood that any of the other substances mentioned may be used. The acid may be of any concentration, preferably of 80% to 93.5% strength.

Where an acid of this strength is employed, about 0.2% to 1%, preferably 0.3% to 0.5% of the weight of the oil being treated is used. This small quantity of acid reacts only with the more easily polymerized gums, reduces the amount of sludge formed to a minimum, and also does not appreciably affect the more stable unsaturated hydrocarbons. In other words, with this reduced amount of acid, the yield of refined product is increased.

The oil thus treated is discharged through pipe 21 into a large settling tank 22 wherein the sludge and solid matter settles. The oil may be taken from a launder 23 around the upper edge of the tank and by a pump 24 delivered to a digester 25 wherein the oil is subjected to heat and pressure. As illustrated, the digester may comprise a cylinder 26 having a steam jacket 27. Preferably, there is disposed within the cylinder a mass of granular chemically inert material such as coke, pumice, sand, or the like. The cylinder may also be provided with a pressure gauge 28 and a thermometer well 29. Steam may be supplied to the jacket through the inlet 30 and exhausted through the outlet 31. The oil is pumped up through the mass of granular material, which acts to disseminate it throughout the cylinder and maintain it at substantially a uniform temperature throughout the interior thereof.

The temperature to which the oil is heated depends upon the kind and type of hydrocarbon and the treatment to which it has been subjected to polymerize the gum forming constituents. Where acid is employed, the temperature to which the hydrocarbon is heated depends upon the relative amount and strength of the acid. Generally speaking, the greater the amount and strength of the acid, the lower the temperature to which the oil is subjected in the digester. If the oil has been treated with a relatively large quantity of acid or with acid of a very high concentration, care must be taken not to subject it to high temperatures, since the oil under these conditions tends to be burnt. An oil which has been acidulated with a small quantity of acid or with acid of a lower concentration may be heated to a higher temperature than the foregoing. To give some idea of the temperatures employed, for one kind of oil a temperature of 500° F. is required, whereas for other oils a temperature as low as 150° F. suffices. Generally speaking, the temperatures which are used in the most instances lie between 200° and 325° F.

The hydrocarbon in the digester is maintained at such a pressure as to keep practically all of the oil in the liquid phase. The amount of pressure depends upon the kind and type of oil being treated and the temperature. For example, for a coke oven light oil containing 90% of a fraction boiling below 200° C. and having a distillation range of 78° to 260° C., the pressure required is 80 pounds per square inch at a temperature of 275° F. At 500° F. the pressure required is 1600 pounds per square inch. The length of time which the oil is subjected to the elevated temperature and pressure varies with the different kinds and types of oils, the degree of acidulation, the substance employed to polymerize the gums and the temperature to which it is heated. Some oils may be subjected to an elevated temperature for several hours, whereas others should not be treated this way for more than a few minutes. One or two experiments will indicate the proper temperature and length of time.

The treated oil is discharged from the digester 25 through pipe 30 to a cooler 31, wherein the temperature of the hydrocarbon is reduced to about that of the atmosphere. Thereafter the oil passes through the pressure regulating valve 32 which acts to maintain the required pressure in the digester.

After leaving the pressure regulating valve, the hydrocarbon can be given either of the treatments A or B previously outlined.

For treatment A, the hydrocarbon passes along pipe 33 to the washing tank 34, where it may be washed with water or sodium hydroxide or both, supplied from the tanks 35 and 36. After being washed, the hydrocarbon is conducted by means of pipe 37 to the distilling column 38 for the purpose of having the polymerized gums removed. From the distilling column the distillate may be conducted by pipes 39 and 40 to the refined oil storage tank 41. A condenser 42 may be located in the line 39 for the purpose of condensing the distillate.

According to another course, the distillate may be taken from pipe 39, and by means of pipe 43 conducted to a washing tank 44 supplied with water or sodium hydroxide or both, from the tanks 45 and 46. After the washing, the hydrocarbon is conducted to the refined oil storage tank by pipe 40a.

According to treatment B, the liquid oil, after it leaves the pressure regulating valve 32, may be conducted by pipe 48 to a container 49 filled with a hard porous adsorbent material 50, the treatment with the porous adsorbent being at normal or atmospheric temperature. This treatment removes the polymerized gums and any substances like sulphur molecules that are in solution in the oil and have not been taken out by the previous steps of the process. After the treatment with the adsorbent material, the liquid hydrocarbon may be given any one of three treatments.

According to one of the treatments, the oil, after it leaves the adsorbent material, is taken by pipe 51 to the washing tank 34, where the oil may be washed with water or sodium hydroxide or both. After the washing, the hydrocarbon may be conducted to the refined oil tank by means of pipes 37 and 52, or may be taken to the distilling column by means of pipe 37. Thereafter the distillate may be conducted to the refined oil storage tank by pipes 39 and 40, or may be given a washing before being conducted to the tank.

According to another arrangement, the oil, after it leaves the adsorbent material 50, may be conducted to the refined oil storage tank through pipes 53, 37 and 52.

According to a third method of treating the hydrocarbon after it leaves the adsorbent material 50, the liquid is conducted by pipe 53 to pipe 37 and thence to the distilling column. Afterwards the distillate may be washed in the washing tank 44 or may be conducted directly to the refined oil tank 41.

The adsorbent material 50 may consist of one or more of the following: bauxite, fuller's earth, bentonite, charcoal, adsorbent clays, or dried gels of silica, tungsten oxide, aluminum oxide and stannic oxide.

If the hydrocarbon contains any substantial amount of unsaturated hydrocarbons, it is preferred to use water as the washing liquid, since where sodium hydroxide is employed with oils of this type, the traces of sodium hydroxide left in the oil affect the color and increase the gum content of the oil after it has been in storage for a time.

The refined product obtained by the process described herein where an adsorbent like silica gel is employed, is more thoroughly refined than a product obtained by the process that does not include the step of treatment with the adsorbent.

In many instances, this latter product is sufficiently refined to meet the requirements of the consumer, and is satisfactory as a motor fuel if it is used immediately or a short time after the refining. However, if the distilled product is stored for a time, it becomes less desirable for motor fuel because of the presence of gum forming compounds and substances imparting color to it. The heat and pressure treatment (without using an adsorbent) described herein, does not remove or polymerize all of the color imparting substances or gum forming compounds, so that if the oil has been in storage for some time, these compounds cause it to become discolored and affect the properties of the oil to such a degree as to render it practically useless and undesirable as a motor fuel The pipes and tanks are provided with suitable valves and drains, as shown in the drawing.

Having thus described the invention, what is claimed as new and desired to be secured by Letters Patent is:

1. The method of refining liquid low boiling hydrocarbon distillates containing gum forming constituents consisting in treating the distillate with an acidic reagent of such concentration and in such quantity at ordinary temperature and atmospheric pressure as to polymerize only the more easily reactive of the gum forming constituents and form only a small amount of sludge, separating the sludge from the hydrocarbon, subjecting the treated hydrocarbon while containing the balance of the acid hydrocarbon reaction products resulting from said acid treatment in the absence of a solid porous adsorbent material to an elevated temperature and pressure sufficient to keep it liquid for a sufficient time to polymerize the more difficultly reactive of the gum forming constituents, and then distilling to separate the treated hydrocarbon from the polymerized products, thereby obtaining a final product substantially freed of gum forming constituents.

2. The method according to claim 1 wherein the acidic re-agent is sulphuric acid of 80 to 93.5% concentration and the quantity of such acid is less than 1% by weight of the distillate treated.

3. The method of refining liquid low boiling hydrocarbon distillates containing gum forming constituents consisting in treating the distillate with an acidic re-agent of such concentration and in such quantity at ordinary temperature and atmospheric pressure as to polymerize only the more easily reactive of the gum forming constituents and form only a small amount of sludge, separating the sludge from the hydrocarbon, subjecting the treated hydrocarbon while containing the balance of the acid hydrocarbon reaction products resulting from said acid treatment in the absence of a solid porous adsorbent material to a temperature of about 200° to 350° F. and pressure sufficient to keep it liquid for a sufficient time to polymerize the more difficultly reactive of the gum forming constituents, and then distilling to separate the treated hydrocarbon from the polymerized products thereby obtaining a final product substantially freed of gum forming constituents.

4. The method according to claim 3 wherein the acidic re-agent is sulphuric acid of 80 to 93.5% concentration and the quantity of such acid is less than 1% by weight of the distillate treated.

5. The method according to claim 3 wherein the hydrocarbon is washed prior to distilling.

6. The method of refining liquid low boiling hydrocarbon distillates containing gum forming constituents consisting in treating the distillate with an acidic re-agent of such concentration and in such quantity at ordinary temperature and atmospheric pressure as to polymerize only the more easily reactive of the gum forming constituents and form only a small amount of sludge, separating the sludge from the hydrocarbon, subjecting the treated hydrocarbon while containing acid hydrocarbon reaction products resulting from said acid treatment in the absence of a solid porous adsorbent material to a temperature of about 200° to 350° F. and pressure sufficient to keep it liquid for a sufficient time to polymerize the more difficultly reactive of the gum forming constituents, treating the treated hydrocarbon with a solid porous adsorbent material to extract some of the polymerized products therefrom, and then distilling to remove the hydrocarbon from the remaining of the polymerized products thereby obtaining a final product substantially freed of gum forming constituents.

7. The method according to claim 6 wherein the acidic re-agent is sulphuric acid of 80 to 93.5% concentration and the quantity of such acid is less than 1% by weight of the distillate treated.

8. The method according to claim 6 wherein the hydrocarbon is washed prior to the treatment with the adsorbent material.

ERNEST B. MILLER.
GERALD C. CONNOLLY.